(12) United States Patent
Florindo et al.

(10) Patent No.: US 7,314,405 B2
(45) Date of Patent: Jan. 1, 2008

(54) FEEDER FOR MEAT PIECES MADE OF ENTIRE MUSCLES FOR A PISTON STUFFING MACHINE

(75) Inventors: Frank Florindo, Pamplona (ES); Klaus Kapps, Pamplona (ES)

(73) Assignee: Viscofan, S.A., Pamplona (ES)

( * ) Notice: Subject to any disclaimer, the term of this patent is extended or adjusted under 35 U.S.C. 154(b) by 369 days.

(21) Appl. No.: 11/064,118

(22) Filed: Feb. 17, 2005

(65) Prior Publication Data

US 2006/0183413 A1    Aug. 17, 2006

(51) Int. Cl.
*A22C 11/00* (2006.01)
(52) U.S. Cl. ...................................................... 452/31
(58) Field of Classification Search ...................... None
See application file for complete search history.

(56) References Cited

U.S. PATENT DOCUMENTS 3,857,330 A * 12/1974 Ruckstaetter ................ 99/354
4,548,573 A * 10/1985 Waldstrom ................... 425/442
4,666,722 A *  5/1987 Creed et al. ................. 426/393
4,747,186 A *  5/1988 Spike ............................ 452/35
4,800,094 A *  1/1989 Freda et al. .................. 426/513

* cited by examiner

*Primary Examiner*—Thomas Price
(74) *Attorney, Agent, or Firm*—Notaro & Michalos PC

(57) ABSTRACT

Incorporates buckets (3) open on their top in which the meat pieces are loaded, moving on traction device (4) that execute a step by step motion towards the feeding area located between the piston (1) and the body of the stuffing machine (2), where the meat piece is pushed by the piston (1) towards the body of the stuffing machine (2) for compacting and subsequently wrapping it. The buckets (3) have open front and rear faces to facilitate the run of the piston (1) and the exit of the meat piece towards the body of the stuffing machine (2). In addition, a device is provided for facilitating the centered position of the bucket with respect to the position of the piston (1) in the feeding area.

7 Claims, 3 Drawing Sheets

FEEDER FOR MEAT PIECES MADE OF ENTIRE MUSCLES FOR A PISTON STUFFING MACHINE

OBJECT OF THE INVENTION

The present invention applies to the field of apparatuses for stuffing meat pieces made of entire muscles in, at least, a netting.

The object of the invention is an automatic feeder of meat pieces made of entire muscles that is provided with means for carrying the meat that allow to contain the meat in an orderly manner and carry it for its sequential positioning in a feeding area where a piston is located that pushes the meat toward the cylindrical body of a stuffing machine.

Also the object of the invention is that the carrier means are accessible to the race of the piston that pushes the meat toward the stuffing machine body and that the feeder is provided with centring means that correct in the feeding area the position of the carrier means with respect to the position of the piston.

BACKGROUND OF THE INVENTION

Processes for stuffing meat products have been continually improved over the years.

U.S. Pat. No. 4,155,212, for example, relates to a mechanism for wrapping a netting around a meat piece, provided with a cylinder around which is placed the netting in which the meat piece supplied from a table is introduced manually and pushed manually or by a piston. The meat is pushed through the inside of the cylinder and leaves out of its discharge opening wrapped in the netting.

U.S. Pat. No. 4,621,482 considers the additional application of a collagen film that, together with the netting, wraps the meat in a stuffing apparatus.

An evolution of these systems is found in U.S. Pat. Nos. 4,910,034 and 4,958,477, which respectively show a process and an apparatus for production of meat products. The process for obtaining the final product consists mainly of simultaneously wrapping the meat products with a collagen film and an elastic netting supplied from tubes concentric to the central tube in which the meat pieces travel. Both the meat feeding and impulsion through the tube are manual in these systems.

The manual stuffing process generally requires one person to feed the meat pieces to the machine and another person to receive the stuffed product from the applicator tube, conform and clip it and deliver it to a third person who clips it. The working speed of this system is not greater than 5 pieces per minute. Applicators exist that are connected to a stuffing machine that feeds the meat, but their speed is the same, although they work with one less person.

The TCM machine of Tipper Tie incorporates a pneumatic piston for pushing the meat and an automatic clipping system at the applicator outlet that allows a rate of 7-8 pieces per minute. However, it has limitations regarding the dimensions of the clipping system, its slowness and the need to feed the machine manually interrupting the process during loading.

Patent application WO 03/066440 describes a method and apparatus for automatic stuffing of meat pieces in a double casing of film and netting, in which participate a synchronised stuffing machine and fast clipper and where the meat piece is made to pass through a tube with a small diameter independent of but smaller that the size of the finished product. The rates reached depend on the flow of meat that the stuffing machine can impel and the time taken by the clipper to clip, reaching a production on the order of 30 pieces per minute.

The machine that constitutes the object of the aforementioned patent application WO 03/066440 is conceived to stuff only meat made of small pieces that can be fed by pumping by a stuffing machine.

There are, however, a number of products that must be manufactured without pumping. These are those made of entire muscles. These are top-end products that require the integral maintenance of the muscle structure and those in which it is desired to have the product wrapped with its skin visible on the surface. These products cannot be stuffed by a pumping means nor through small diameter tubes, as they would lose their structure and order.

If the apparatus described in the aforementioned U.S. Pat. No. 4,958,477 is provided with a mechanical impulsion means, such as a pneumatic piston, and combined with an "iris" type clamp clipper such as that described in U.S. Pat. No. 6,705,063, which allows passage of pieces with a diameter of up to 180 mm and a high-rate clipping, this may provide a first step towards mechanisation of the stuffing process of said products that cannot be pumped. However, to improve the results obtained by the aforementioned TCM machine of Tipper Tie, this system would require an automatic stuffing system that reduces to a minimum the loading time of the entire muscles.

In manual loading systems the meat pieces are loaded in a chamber of the applicator after the cylinder has retracted from its pushing stroke. To do so, the chamber lid must be opened and the meat piece must be placed in it orderly and with a specific orientation, taking care that the skin, if it must be visible from the outside in the stuffed product, is properly extended in the surface. The preparation time involved in positioning the meat piece and the subsequent closing of the lid, whether manually or mechanically, until the meat is finally impelled by the piston, implies lost time for the system that will remain unproductive.

The automation of the feeding and its operative optimisation therefore constitute the objectives of the invention described below.

DESCRIPTION OF THE INVENTION

The feeder for meat pieces made of entire muscles for a piston stuffing machine that constitutes the object of this invention allows optimising the time employed in feeding the meat to the stuffing machine, which is provided for this purpose with carrier means consisting of buckets mounted on traction means, in each of which the meat is loaded and ordered to be carried to the feeding area for individualised processing by pushing into the cylindrical body of the stuffing machine, from which the meat piece is obtained stuffed in a netting and, occasionally, also by a film.

Unlike other systems, in this automatic feeder no time is wasted to position the meat before it is pushed to the stuffing machine, as the meat is loaded and ordered manually on the buckets that have not yet arrived at the feeding area, allowing the bucket loading operation to take place while other meat pieces are being stuffed.

The buckets have a large space in which the meat is deposited, and they are open on their front and rear faces to allow the meat to exit and the piston to advance through them in the feeding area. The incorporation has been foreseen in the manual loading area of lateral stops between which move the buckets that prevent the exit of the meat from the front or rear face and limit the maximum volume of the bucket that can be loaded with meat.

The traction means preferably consist of a conveyor chain that uses a servomotor advancing each bucket step by step in a controlled manner by a distance corresponding to the width of the bucket, so that each bucket is positioned centred in the feeding area, preventing the piston from interfering with the bucket in the stroke in which it pushes the meat contained in said bucket.

Said feeding area includes a proximity sensor that is triggered when there is an error in the bucket positioning so that the bucket oversteps its expected position. In this case, a metal telltale in the bucket will be opposite the proximity sensor, which will brake the motor associated to the traction means.

In addition, the buckets are floating and have a millimetric play that allows their transverse displacement with respect to the traction means in the feeding area to regulate the relative position of the bucket with respect to the piston.

Said feeding area is provided on its top with a lid able to move vertically, which in its downwards motion meets the bucket if it is displaced, moving its transversally to the conveyor chain to centre it with respect to the piston. The lid, together with the open bucket, thereby forms a chamber located in a position prior to the body of the stuffing machine. In this situation the piston enters the bucket freely, pushing the meat and displacing it towards the body of the stuffing machine.

DESCRIPTION OF THE DRAWINGS

To complement the description being made and in order to aid a better understanding of the characteristics of the invention, according to an example of a preferred embodiment, a set of drawings is accompanied as an integral part of the description where for purposes of illustration and in a non-limiting manner the following is shown.

PREFERRED EMBODIMENT OF THE INVENTION

The feeder for meat pieces made of entire muscles that constitutes the object of this invention is meant to position meat pieces made of entire muscles in a feeding area between a piston (1) driven by a cylinder (14) and the cylindrical body of a stuffing machine (2), shown in FIG. 1, to push the meat piece using the piston (1) toward the body of the stuffing machine (2) for compacting and subsequently wrapping it.

Figure 1:
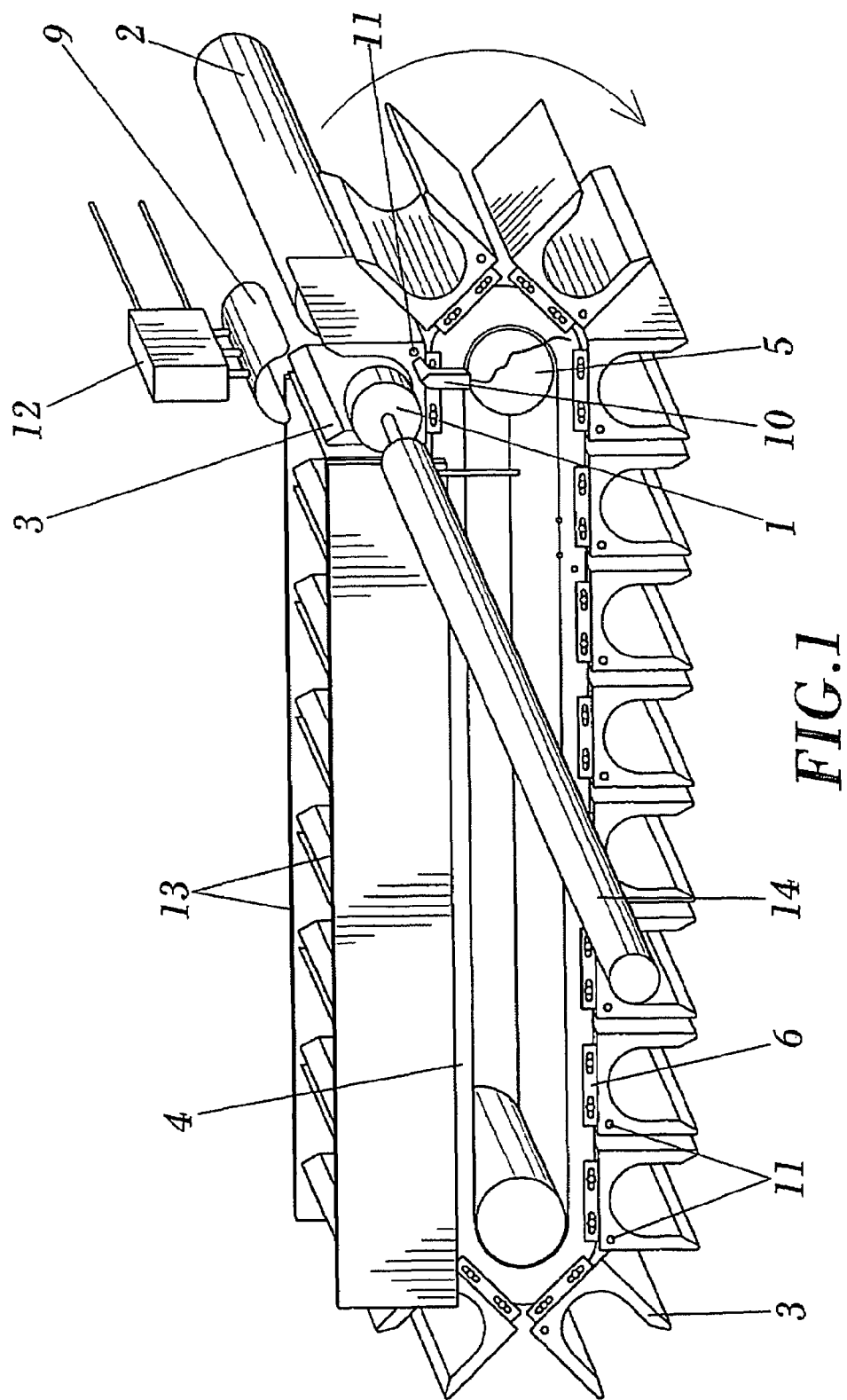
FIG. 1. Shows a perspective view of the feeder for meat pieces made of entire muscles for a stuffing machine.
Figure 4:
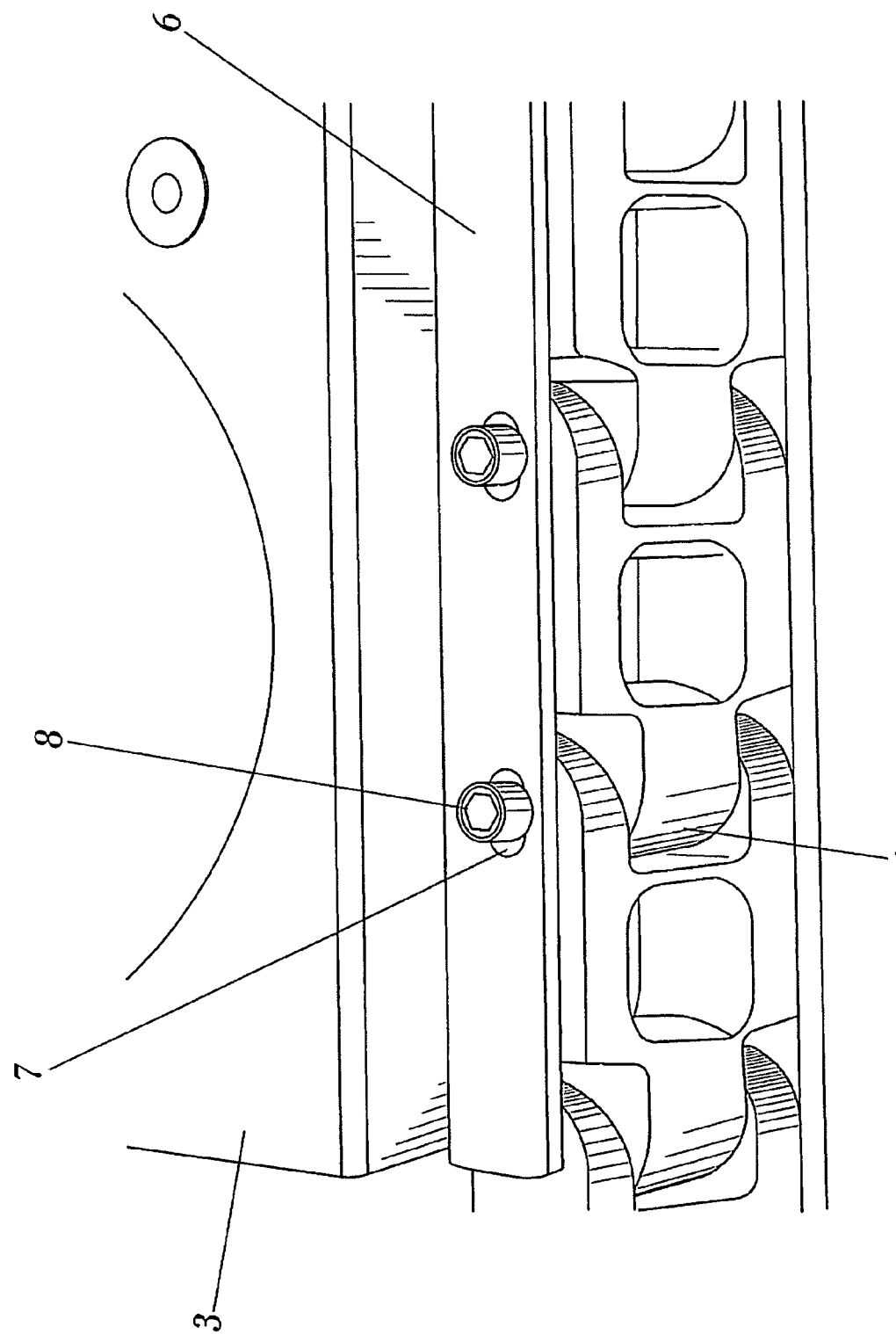
FIG. 4. Shows a bottom perspective view of the bucket mounted on a conveyor chain.

As shown in said FIG. 1, the feeder for meat pieces mainly comprises buckets (3) open on their top face that receive the meat pieces and move mounted on traction means (4), preferably a conveyor chain (4) having a cyclical motion driven by a motor (5) and shown in FIG. 4, which executes a step by step motion towards the feeding area; in addition, the buckets (3) have open front and rear faces to allow the run of the piston (1) and the exit of the meat piece towards the body of the stuffing machine (2).

Figure 2:
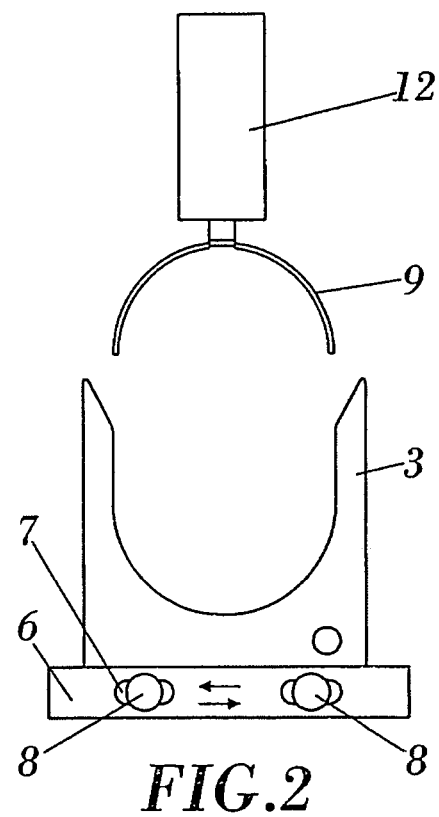
FIG. 2. Shows a front view of the bucket in correspondence with the lid showing the play that allows displacing the bucket with respect to the conveyor chain.
Figure 3:
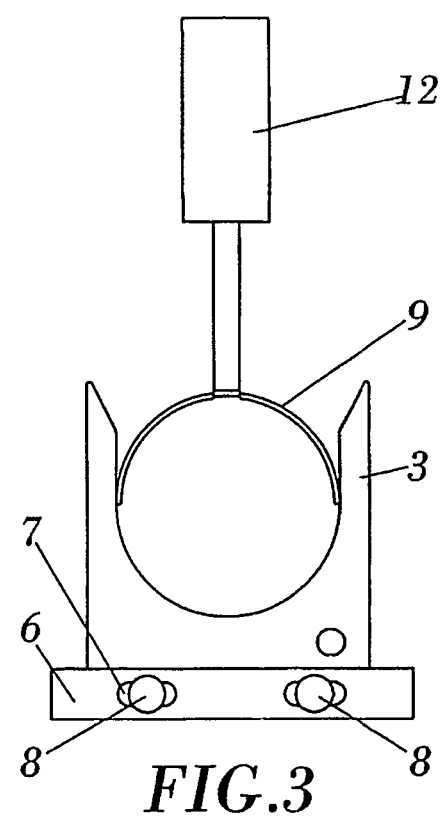
FIG. 3. Shows a front view of the bucket for the bottom position of the lid with the bucket centred.

The bucket (3) is provided with lateral plates (6) with slits (7), as shown in FIGS. 2 to 4, in which are placed transverse screws (8) associated to the traction means (4) with respect to which the lateral plates (6) move with a play to facilitate the centred positioning of the bucket (3) with respect to the piston (1) in the feeding area.

A lid (9) is provided in this feeding area which can move vertically to fall on the static bucket (3) containing the meat piece to be compacted, displacing the bucket (3) with respect to the traction means (4) in order to centre it with respect to the position of the piston (1). FIGS. 2 and 3 shown the downwards motion of the lid (9) by the action of a cylinder (12). In this case, an embodiment is represented in which the lid (9) is downwardly concave and the bucket (3) has a curved receptacle defined by vertical walls with upper bevels that facilitate the contact of the lid (9) as it falls on the bucket (3) for positioning it with respect to the traction means (4).

It is also worth noting that the feeding area contains a proximity sensor (10) and that the bucket (3) is provided with a metallic telltale (11) which, when located opposite the proximity sensor (10) is detected by it to stop the traction means (4), placing the bucket (3) in the feeding area.

In addition, on top and to the sides of the traction means (4) the feeder is provided with fixed stops (13) that prevent the meat from exiting the buckets (3) through their open front and rear faces.

The invention claimed is:

1. Feeder for meat pieces made of entire muscles for a piston stuffing machine having a body for receiving a meat piece, the feeder comprising: a plurality of buckets (3) that are each open on their top face, have an open front face and an open rear face and that respectively receive the meat pieces; traction means (4) connected to the buckets for moving the buckets one at a time and in a step by step movement towards a feeding area; and a piston (1) at the feeding area for stuffing a meat piece that is in a bucket that is at the feeding area into the body of the stuffing machine (2).

2. Feeder for meat pieces made of entire muscles for a piston stuffing machine according to claim 1, wherein each bucket (3) includes a pair of lateral plates (6) with slits (7) and transverse screws (8) inserted into the slits and into the traction means (4) for fixing the lateral plates (6) to center each respective bucket with respect to the piston (1) in the feeding area.

3. Feeder for meat pieces made of entire muscles for a piston stuffing machine according to claim 1, including, at the feeding area, a lid (9) for moving into a bucket (3) containing a meat piece in the feeding area for compacting the meat piece and for centering the bucket (3) with respect to the traction means (4) for centering the bucket with respect to the piston (1).

4. Feeder for meat pieces made of entire muscles for a piston stuffing machine according to claim 3 wherein the lid (9) is downwardly concave and the bucket (3) has a curved receptacle limited by vertical walls with upper bevels that facilitate contact of the lid (9) as it descends against the bucket (3) for positioning the bucket with respect to the traction means (4).

5. Feeder for meat pieces made of entire muscles for a piston stuffing machine according to claim 1, wherein the feeding area includes a proximity sensor (10) and the bucket (3) is provided with a metallic telltale (11) whose position opposite the proximity sensor (10) is detected by the proximity sensor to stop the traction means (4), for placing the bucket (3) in the feeding area.

6. Feeder for meat pieces made of entire muscles for a piston stuffing machine according to claim 1, including fixed stops (13) on a top and sides of the traction means (4) which prevent the meat from exiting the buckets (3) through the open front and rear faces.

7. Feeder for meat pieces made of entire muscles for a piston stuffing machine according to claim 1, wherein the traction means (4) consist of a conveyor chain (4) with a cyclical movement.

\* \* \* \* \*